United States Patent [19]
Heberlein

[11] 4,437,705
[45] Mar. 20, 1984

[54] SELF-LOCKING TRUCK SIDEBOARD LIFT AND DUMP MECHANISM

[76] Inventor: George J. Heberlein, 1701-33rd Ave., Greenley, Colo. 80632

[21] Appl. No.: 315,613

[22] Filed: Oct. 28, 1981

Related U.S. Application Data

[63] Continuation-in-part of Ser. No. 66,939, Apr. 4, 1980, abandoned.

[51] Int. Cl.³ .............................................. B60P 1/26
[52] U.S. Cl. ................................... 298/1 R; 105/240; 222/504; 298/23 MD
[58] Field of Search ............... 298/7, 13, 35 M, 17.7, 298/18, 1 R, 23 R, 23 MD, 23 M, 23 S, 23 A, 23 B, 23 F, 23 D, 23 DF, 38; 105/240, 269, 256, 258, 259, 260, 284, 286; 222/504

[56] References Cited

U.S. PATENT DOCUMENTS

| | | | |
|---|---|---|---|
| 2,261,099 | 10/1941 | Fairbanks | 298/23 MD |
| 3,773,385 | 11/1973 | Sandberg | 298/23 MD |
| 3,977,718 | 8/1976 | Nordberg | 298/23 MD X |
| 4,052,106 | 10/1977 | Louderback, Jr. | 298/23 MD |
| 4,076,310 | 2/1978 | Schwalm | 298/23 MD |

*Primary Examiner*—Frank E. Werner
*Attorney, Agent, or Firm*—William E. Hein

[57] ABSTRACT

A hydraulically controlled mechanism employed to automatically raise and lower the sideboard of a truck box includes provision for positively locking the sideboard when it is in the fully closed position such that inadvertent opening of the sideboard is prevented even in the event of the loss of hydraulic pressure.

2 Claims, 3 Drawing Figures

SELF-LOCKING TRUCK SIDEBOARD LIFT AND DUMP MECHANISM

CROSS REFERENCE TO RELATED APPLICATION

This is a continuation-in-part of parent application Ser. No. 066,939, filed on Apr. 4, 1980 by the same inventor, which parent application is now abandoned.

BACKGROUND AND SUMMARY OF THE INVENTION

This invention relates generally to load-carrying truck boxes of the type having a hinged sideboard and more particularly to a mechanism for opening and closing such sideboards.

Many trucks that have been in common use in farming operations for a number of years are adapted to haul a variety of farm commodities such as sugar beets, silage, grain and the like. These trucks are typically referred to as beet trucks and are characterized in that they have a load-carrying box that includes a pair of sideboards hinged adjacent the bed of the truck box. Loads carried by such trucks are typically dumped by first moving one of the hinged sideboards from an upright or closed position to a lowered or open position and by then tilting the truck box in the direction of the lowered sideboard to effect dumping of the remainder of the load. In the ordinary type of beet truck now commonly used, it is necessary for the driver to leave the driver's seat on arrival at his load-dumping destination, release a chain at each end of the sideboard that is used to hold the sideboard in the closed position, and lower the sideboard by hand. After unloading the truck the driver must then manually raise the sideboard and secure the chain at each end of the sideboard before returning to the driver's seat. This manual lowering and raising of the sideboard represents an inconvenience to the truck driver and, in addition, poses a risk of injury in the event the force presented by the load is too great to allow the driver to hold the sideboard while lowering it.

Several attempts have been made to automate the lowering and closing of truck sideboards. Exemplary of these prior art attempts are the teachings of U.S. Pat. Nos. 4,052,106 and 3,977,718. While some degree of automation is achieved by these prior art inventions, they variously suffer the disadvantages of not providing a positive lowering and raising action while at the same time permitting the sideboard a degree of freedom of movement based on the force exerted by the load and of not providing a locking mode when the sideboard is in the closed position to positively hold it in that position in the event of loss of hydraulic pressure to the cylinders that exert the actuating force.

Accordingly, it is the principal object of the present invention to provide an automatic, self-locking sideboard lift and dump mechanism that permits the sideboard a degree of freedom of position during lowering as a function of the force exerted thereon by the load.

These objects are accomplished in accordance with the illustrated preferred embodiment of the invention by employing dual lift mechanisms, one adjacent each end of a sideboard. Each lift mechanism includes a hydraulic cylinder, a rotatable shaft having lever arm extensions at each end thereof, a corner bracket mounted to the sideboard, and a linkage arm articulately coupling a pivot point on the corner bracket with one of the lever arm extensions.

DESCRIPTION OF THE PREFERRED EMBODIMENT

Figure 1:
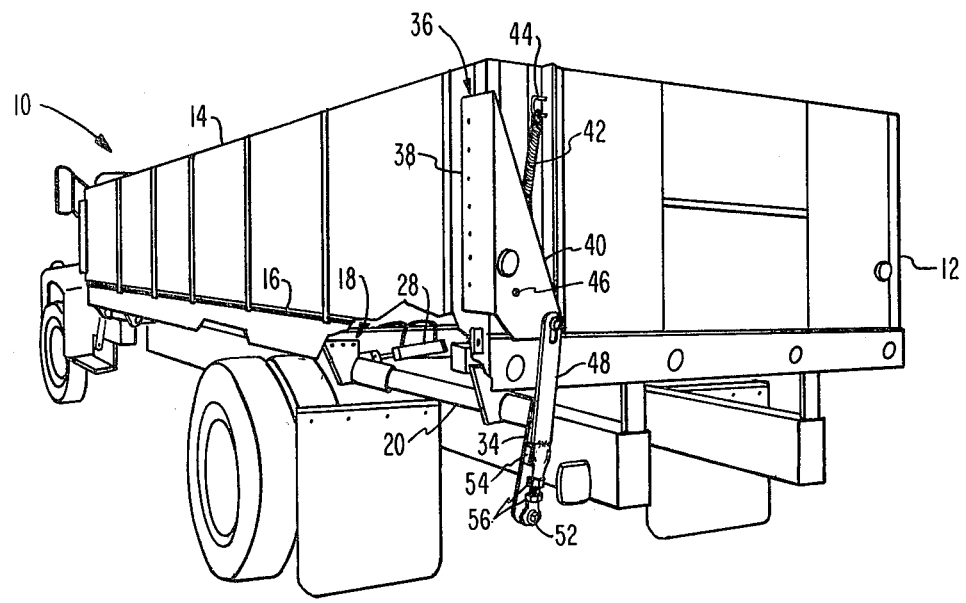
FIG. 1 is a pictorial representation of a truck equipped with the lift mechanism of the present invention.
Figure 2:
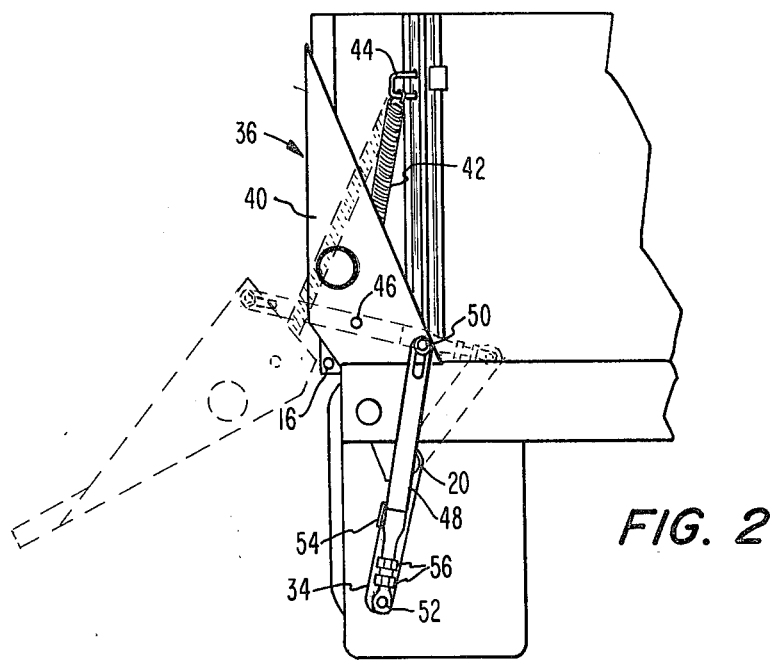
FIG. 2 is a rear view of the truck of FIG. 1 illustrating the position of the mechanical linkage of the lift mechanism of the present invention when the sideboard is in the closed position and in the depending equilibrium position.
Figure 3:
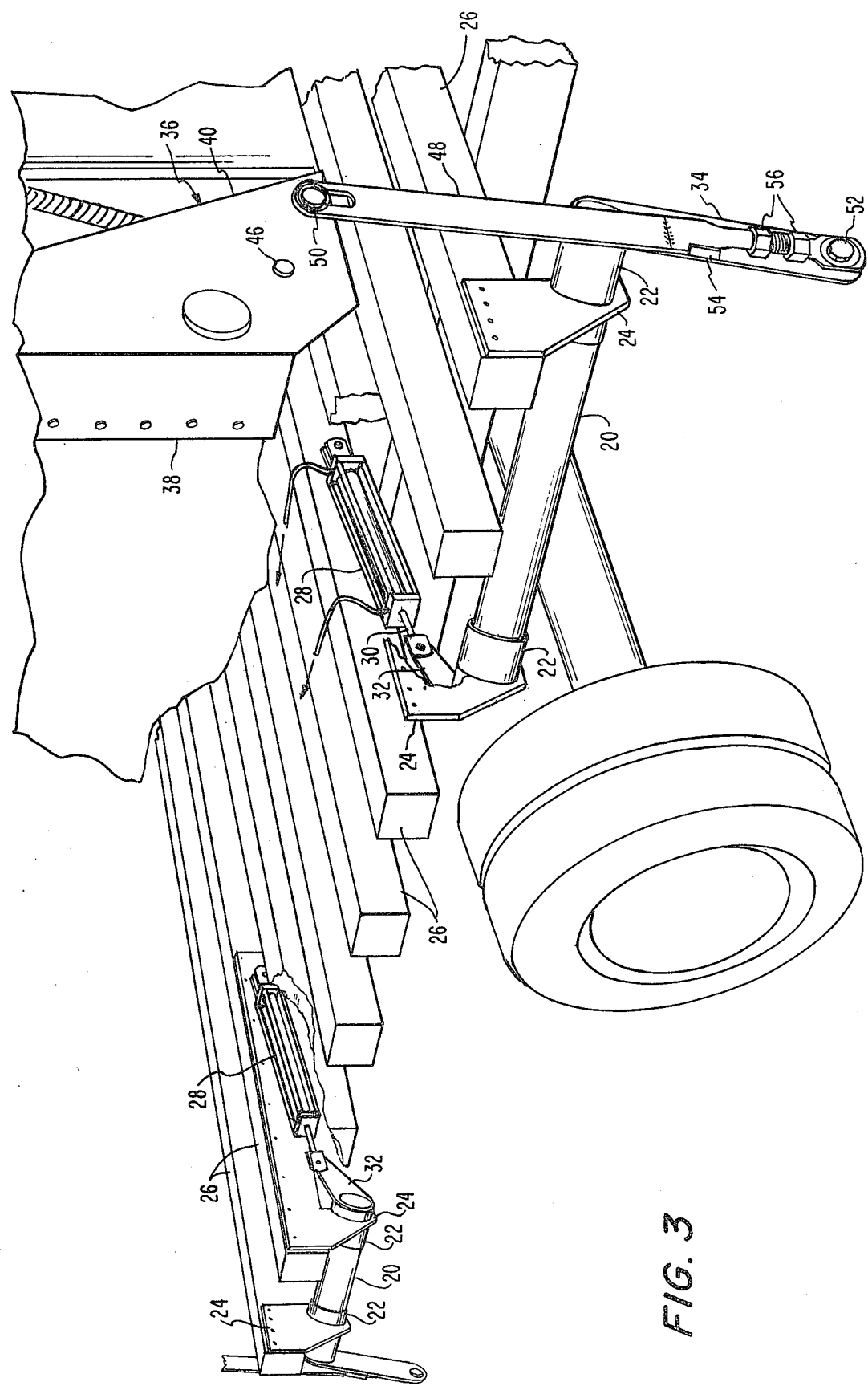
FIG. 3 is an enlarged fragmentary view of the truck of FIG. 1 illustrating the details of the lift mechanism of the present invention.

Referring now to the drawings in detail, it will be seen that there is illustrated in FIG. 1 a conventional beet truck 10 including a box 12. Box 12 comprises a plurality of walls or sides, including a sideboard 14 forming a longitudinal side thereof. Sideboard 14 is hingedly attached to the bottom or bed of the box 12 by means of a longitudinal hinge 16 that permits the sideboard 14 to swing from its normally closed position to a depending or open position. In order to facilitate the lowering and raising of the sideboard there is provided a lift mechanism 18, the details of which are illustrated in FIGS. 2 and 3. In view of the fact that the sideboard of the typical beet truck ranges from twelve feet to over twenty feet in length and, further, that a typical load may exert a pressure of several tons against the sideboard, dual lift mechanisms 18 are employed, one adjacent the front end of sideboard 14 and one adjacent the rear end thereof. It should be understood that the two lift mechanisms 18 are identical in construction and operation and are mounted on truck 10 so as to be mirror images of each other. The details of construction and operation of lift mechanisms 18 may now be understood with reference to the overall illustrations of FIG. 1 as well as to the detailed illustrations of FIGS. 2 and 3.

Each one of lift mechanisms 18 includes a shaft 20 that is longitudinally mounted for rotation just beneath the bed of box 12 and adjacent one end of sideboard 14. Shaft 20 is mounted for rotation inside a pair of bearing sleeves 22, each of which is fixedly attached to a plate member 24 that is in turn mounted to one of a plurality of joist members 26 that provides structural support for box 12. A hydraulic cylinder 28 is articulately mounted at one end by way of a bolt or pin on one of plate members 24 and is conventionally controlled via a common hydraulic system from the driver's seat of truck 10. An extendable piston rod 30 of hydraulic cylinder 28 is pivotally attached to a perpendicular lever arm extension 32 at one end of shaft 20. A perpendicular lever arm extension 34 of the opposite end of shaft 20 is arranged to depend therefrom at a slight angle to the outside of the vertical, as viewed from the rear of truck 10, when the piston rod 30 of hydraulic cylinder 28 is in the fully retracted position. Associated with each one of lift mechanisms 18 is a corner bracket 36, which comprises a generally rectangular sideboard plate portion 38 that is fixedly attached to the sideboard 14 adjacent the end thereof, and a perpendicularly positioned, generally triangular rear plate portion 40. Corner bracket 36 is mounted on sideboard 14 so that rear plate portion 40 thereof extends slightly beyond the end of sideboard 14 and is plumb with depending lever arm extension 36. A counterbalancing tension spring 42, positioned partially with rear plate portion 40 of corner bracket 36, is connected between a fixed point 44 on the rear wall of box 12 and a point 46 on the rear plate portion 40 of corner bracket 36. Counterbalancing spring 42 is provided to counterbalance the weight of sideboard 14. A link 48 is connected between a pivot point 50 on the rear plate portion 40 of corner bracket 36 and another pivot point 52 adjacent the depending end of lever arm extension 34. Link 48 is slotted for a short distance adjacent its connection at pivot point 50 and is further constructed so that its length may be adjusted slightly by way of a pair of adjusting nuts 56. A stop 54 is attached adjacent the outside edge of lever arm extension 34 for receiving link 48 when piston rod 30 of hydraulic cylinder 28 is in the fully retracted position and sideboard 14 is in the closed position. The location of pivot point 50 on rear plate portion 40 of corner bracket 36 is chosen such that link 48 will engage stop 54 and that the centerline of link 48 will lie outside the longitudinal axis of shaft 20 when piston rod 30 of hydraulic cylinder 28 is in the fully retracted position and sideboard 14 is in the closed position. This mechanical arrangement results in sideboard 14 being automatically locked in the closed position independent of any loss of hydraulic pressure to cylinder 28. Any force exerted against sideboard 14 by the load contained within box 12 will only result in link 48 being urged with greater force against stop 54, which, in turn, inhibits rotation of shaft 22 so as to positively prevent the accidental lowering of sideboard 14.

Referring now particularly to FIGS. 2 and 3, it will be seen that actuation of hydraulic cylinder 28 so that piston rod 30 becomes more extended will cause counterclockwise rotation of shaft 20 and consequently of lever arm extension 34, as viewed from the rear of the truck 10. The counterclockwise rotation of shaft 20 will result in sideboard 14 being lowered approximately 160° from its closed position when piston rod 30 of hydraulic cylinder 28 is in the fully retracted position. The weight of the load being dumped may overcome the conterbalancing force of tension spring 42 and push the sideboard 14 to the 180° or fully open position. However, when the weight of any load is removed from sideboard 14, counterbalancing tension spring 42 will return sideboard 14 to its equilibrium position of approximately 160° from the fully closed position. Additional flexibility is provided by the aforementioned slot in link 48, which provides some play for sideboard 14 to seek a point of equilibrium. Thus, the risk of bending to link 48 or lever arm extension 34 under heavy loads is minimized. To return the sideboard 14 to its fully closed and positively locked position it is only necessary to actuate hydraulic cylinder 28 so as to retract piston rod 30 thereof. This force causes clockwise rotation of lever arm extension 32, shaft 20, and lever arm extension 34 until link 48 engages stop 54, at which point sideboard 14 is in the fully closed and positively locked position. It should be appreciated that hydraulic cylinder 28 may be actuated such that piston rod 30 is in an intermediate position between the fully extended and fully retracted positions, thus placing sideboard 14 in any desired corresponding position between the fully closed and depending equilibrium position of approximately 160° therefrom.

I claim:

1. A self-locking truck sideboard lift and dump mechanism for use with a truck box having a bed portion, front and rear end members, and at least one sideboard pivotally mounted along a longitudinal edge thereof to the bed portion for movement between a raised or closed position and a depending or open position, said mechanism comprising:

a rotatable shaft mounted against said rear end member and inwardly of and longitudinally parallel to said longitudinal edge of said sideboard and beneath said bed portion of the truck box, a rear end of said rotatable shaft extending outside said rear end member of the truck box;

front and rear bell crank levers mounted to front and rear ends, respectively, of said rotatable shaft;

bracket means mounted adjacent a rear end of said sideboard and having a plate surface substantially parallel to said rear end member and extending inwardly of said longitudinal edge and outside said rear end member;

a linkage arm pivotally connected between a depending end of said rear bell crank lever and a point on said plate surface of said bracket means such that the longitudinal center line of said linkage arm lies outside the longitudinal axis of said rotatable shaft when said sideboard is in the raised or closed position; and hydraulic cylinder means articulately mounted at an end thereof below said bed portion of the truck box and adjacent the front end of said rotatable shaft, said hydraulic cylinder means having a piston end articulately coupled to said front bell crank lever for imparting rotational motion to said rotational shaft;

said rear bell crank lever having stop means mounted thereon for stopping rotation of said rotatable shaft, in a sideboard closing direction, at a position wherein the longitudinal center line of said linkage arm lies outside the longitudinal axis of said rotatable shaft.

2. A self-locking truck sideboard lift and dump mechanism as in claim 1 further comprising counterbalancing spring means connected between said rear end member of the truck box and said bracket means for providing a force counterbalancing the weight of said sideboard.

* * * * *